May 3, 1932. M. HAUSER 1,856,762
STEAM TRAP
Filed Jan. 27, 1930

INVENTOR
Martin Hauser
BY Arthur C. Brown
ATTORNEY

Patented May 3, 1932

1,856,762

UNITED STATES PATENT OFFICE

MARTIN HAUSER, OF KANSAS CITY, MISSOURI, ASSIGNOR TO GENERAL HEATING SPECIALTY COMPANY, OF KANSAS CITY, MISSOURI, A CORPORATION OF MISSOURI

STEAM TRAP

Application filed January 27, 1930. Serial No. 423,727.

My invention relates to steam traps and more particularly to a device of that character for controlling flow of steam and water in a steam line.

It is well known that water condensed in the supply line of a steam heating system and passing with steam into a trap included in the system will collect in the line and particularly in the trap, so that the steam must either pass through the water or be obstructed thereby. Traps heretofore employed have included a valve for trapping or controlling the flow of steam and a valve for effecting release of collected water, but the operation of one valve is usually dependent on the operation of the other, so that the trap is relieved of water only when the steam valve is open and steam is flowing to raise the temperature in the system.

It is desirable to render such steam-controlled valves responsive to changes of temperature, but thermostatically operated steam traps heretofore available have not been adapted for independently effecting release of hot water; the result being that water drains from the system only when the temperature in the trap is sufficiently low to effect operation of the steam valve, and water may collect in the steam line and interfere with the free flow of steam and effective employment of steam for heating or other purposes. Furthermore, a float valve for releasing water from a steam trap operates only when water accumulates in the trap, and appreciable amounts of water remain in the trap when the delivery of steam is suspended and the trap cools.

In view of the conditions above set forth, my invention has for its principal objects to combine thermostatically operated means for controlling flow of steam with means for effecting release of water, to adapt a steam trap for releasing water, to incorporate steam control and water releasing elements in a single structure, and to independently automatically control the movement of steam through a trap and release of water from the trap, whereby steam in a steam line may have free access to all parts of the system behind a steam-retaining trap, and to the trap, and water may be continuously and automatically drained from the system whether the steam controlling valve is open or closed, for conferring maximum efficiency on the system.

In accomplishing these and other objects of the invention, I have provided improved details of structure, the preferred forms of which are illustrated in the accompanying drawings, wherein.

Figure 1:
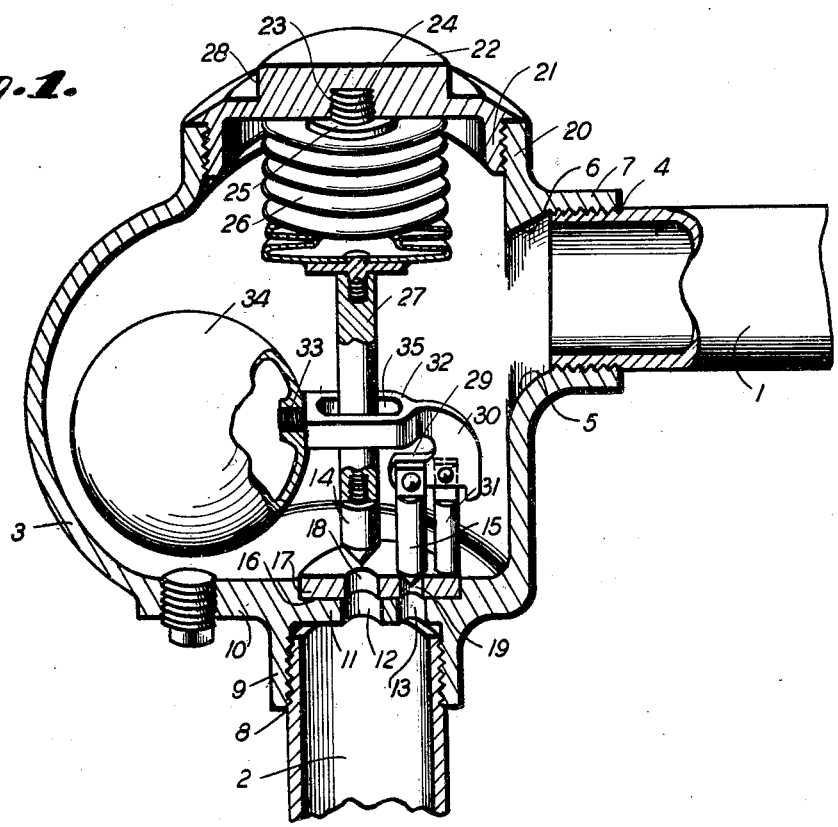
Fig. 1 is a perspective view of a trap constructed in accordance with my invention, interposed in a steam line, the housing being shown in section and parts of the enclosed elements being broken away to better illustrate their character.
Figure 2:
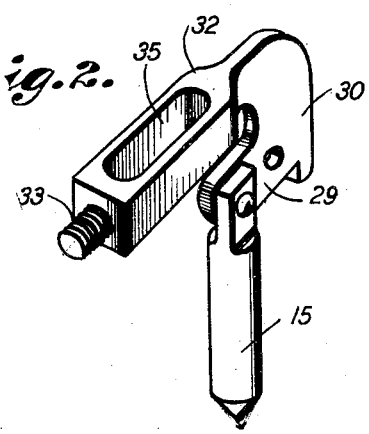
Fig. 2 is a perspective view of a float-operated valve and pivotal arm for supporting a float.
Figure 3:
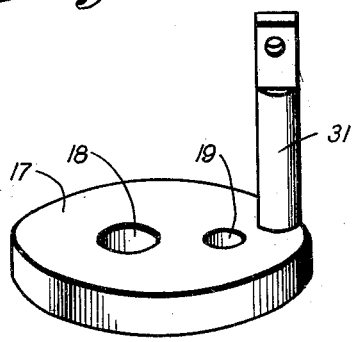
Fig. 3 is a perspective view of a plate provided with ports respectively for steam and water, and a post mounted on the plate to support a float for controlling the water outlet port.

Referring in detail to the drawings:

1 and 2 designate portions of a steam line spaced to receive my improved trap comprising a hollow body or casing 3 having a side inlet opening 4 provided with a curved lower wall portion 5 and a slanting upper wall portion 6, for directing inlet steam downwardly into the casing, and an exterior internally threaded tubular boss around the opening forming an inlet nipple 7 to receive the threaded end of the pipe portion 1, and an outlet opening 8 surrounded by a similar boss 9 internally threaded to receive the threaded end of the pipe portion 2.

The bottom wall 10 of the casing extends across the inner end of the outlet 8 to form a web 11 provided with a central port 12 on the axis of the casing and a smaller port 13 adjacent the periphery of the outlet 8 and communicating therewith, the ports comprising respectively a steam outlet and a water outlet from the trap controlled by independently actuated valves including a thermostatically actuated valve 14 and a float-actuated valve 15, presently described in detail.

In order to reenforce the web and provide suitable seats for the valves at the entrance to the outlets, the bottom wall is recessed to provide a socket 16, and a disk-like plate 17 is pressed into the recess, the disk having ports 18 and 19 slightly smaller respectively than the ports 12 and 13 and concentrically located above the same to cooperate therewith to form outlet passages for steam and water respectively.

In order to support the valve 14 and operate the same to control the steam port, the casing is provided with a relatively large top opening surrounded by an outwardly projecting flange 20 internally screwthreaded to receive the depending skirt 21 of a cap 22. A central screwthreaded opening or socket 23 is provided in the cap on the axis of the outlet opening to receive a threaded stud 24 fixed by a base disk 25 to the upper end of a sylphon bellows 26, a stem 27 being dependingly attached to the lower end of the bellows, and the valve 14 comprising a conical head of wear-resisting material screwthreaded into the end of the stem. The central portion of the cap is thickened to provide an exterior boss 28 and afford substantial depth for the socket 23.

The disk 25 is adapted to firmly engage the lower face of the cap and thus reenforce the upper end wall of the bellows and assist in retaining the bellows in true vertical position.

The valve 15 consists of a stem having a conical head engageable in the water outlet port of the disk, the stem being pivotally suspended from a lateral projecting ear or lever 29 of a float bracket 30 pivotally mounted on the upper end of a post 31 erected at one edge of the disk. The bracket further includes an arm 32 extending above the ear 29 and in the same direction from the post, and having a screwthreaded end 33 an which a globular float 34 is mounted.

The steam outlet port in the disk, and the post, are preferably located on a common diameter of the disk in the vertical plane of the axis of the inlet, and in order to enable the float arm to move freely without interfering with the valve stem 27, the arm is provided with an elongated slot 35 through which the stem 27 extends. The float arm thus further provides a guide for the thermostatically operated valve stem and the stem 27 acts as a retaining member to hold the float and float arm in a vertical path.

The water outlet port in the disk is preferably offset from the common diameter of the steam outlet port and post, and the ear 29 therefore extends in an offset position from the body of the bracket 30.

Attention is called to the position of the recess 16 and the disk 17 in the bottom of the casing, the center of the recess being eccentrically located with reference to the axis of the casing, and the peripheral portion of the disk which supports the post being located in the base of the boss which forms the outlet nipple, to provide sturdier structure.

The portion of the casing wall opposite the inlet is formed arcuately and bulges outwardly to provide a recess for the float. Attention is further called to the fact that the thermosatically operated valve is located in a plane including the extended axis of the inlet, and that the axis of the float bracket and arm are also in said plane whereby steam entering the trap will bear vertically upon the float in the vertical plane of its movement, and sidewise deflection of the float by steam pressure will be minimized, thus avoiding any interference between the float arm and the thermostatically operated stem which might prevent efficient operation of the device.

In using the device, the housing may be installed in a steam line, for example in a return line from a heating system, to receive steam, and trap the same for retaining steam in the system and controlling flow thereof through the system.

A suitable fluid medium is supplied to the bellows to respond to changes in temperature in the casing member, whereby increase of temperature caused by steam entering through the inlet may result in expansion of the bellows and movement of the valve stem toward the disk to close the port and shut off flow of steam through the trap, to retain steam in the system. Reduction of temperature to a predetermined degree due to cooling of steam in the system will result in contraction of the bellows and withdrawal of the valve to permit free flow of steam through the trap and effect raising of temperature in the system.

The float valve controls the independent water outlet comprising the registering ports 13 and 19 independently of operation of the steam valve. When liquid collects in the casing to a predetermined level, the float will operate the arm to lift the valve 15 and open the water outlet and permit water to flow by gravity into the return pipe 2.

Attention is called to the character of the steam-control valve operated by a sylphon bellows, whereby the steam port 12—18 is opened when supply of steam to the line is suspended, and the trap cools.

Water accumulating in the trap due to condensation of steam consequent on suspension of steam supply may not rise to a high enough level to operate the float for opening the water outlet, but the bellows will contract responsively to lowered temperature in the trap, and withdraw the valve from the steam port to permit all water in the trap to escape, the line thus being left open to facilitate driving of air therefrom and flow of steam when delivery of steam is resumed.

What I claim and desire to secure by Letters Patent is:

1. In a steam trap, a hollow body having an inlet and a plurality of outlet ports, a thermostatically controlled valve including a stem and a bellows mounted on the inner wall of the body controlling one of said ports, a float having an arm provided with a slot to permit said stem to pass therethrough pivotally mounted in the body, and a valve operable by said float controlling another of said ports, the slotted arm and stem co-acting to keep the valves aligned with their respective ports.

2. In a steam trap, a hollow body having a recessed bottom wall provided with a plurality of outlet openings, a plate mounted in said recess and provided with a plurality of ports having smaller diameter than said openings and concentric therewith to form steam and water outlets, a post fixed to the plate, a float pivotally mounted on the post, a valve pivoted to the arm for controlling one of said outlets, and thermostatically operating means controlling another of said outlets.

3. In a steam trap, a hollow body having an outlet opening, a plate provided with a plurality of ports covering said opening, a post fixed to the plate, a float including a slotted arm pivotally mounted on the post, a valve pivoted to the arm for controlling one of said ports, and thermostatically operating means including a valve stem extending through the slot of said arm controlling another of said ports.

4. In a steam trap, a hollow body having an outlet opening and a recess substantially defining said opening, a plate provided with a plurality of ports mounted in said recess over said opening, valves controlling said ports, and means including a float having pivotal mounting on the plate for controlling the valves.

5. A steam trap including a hollow body having an outlet nipple and an apertured web extending across said nipple and provided with a recess, a plate seated in said recess and having ports substantially registering with the apertures in the web, valves controlling said ports, and independently operable means one of which is pivotally mounted on said plate for controlling the valves.

6. A steam trap comprising a hollow body having an inlet and an outlet, a web recessed on its upper face extending across said outlet, a central port formed through said web, a second port formed through said web in spaced relation to said first mentioned port, a plate seated in said recess and resting on said web, ports formed through said plate and adapted to register with the ports in said web, an upwardly extending post carried by said plate in radial alignment with said ports, a temperature controlled valve cooperating with one of said ports, a liquid controlled bracket pivotally mounted at one end on said post, and a valve cooperating with the remaining port pivotally carried by said arm.

In testimony whereof I affix my signature.

MARTIN HAUSER.